(12) United States Patent
Sevindik (10) Patent No.: US 9,629,160 B1
(45) Date of Patent: Apr. 18, 2017

(54) METHOD AND SYSTEMS FOR SELECTION OF A SECONDARY CARRIER

(71) Applicant: Sprint Spectrum L.P., Overland Park, KS (US)

(72) Inventor: Volkan Sevindik, Fairfax, VA (US)

(73) Assignee: Sprint Spectrum L.P., Overland Park, KS (US)

(*) Notice: Subject to any disclaimer, the term of this patent is extended or adjusted under 35 U.S.C. 154(b) by 294 days.

(21) Appl. No.: 14/573,174

(22) Filed: Dec. 17, 2014

(51) Int. Cl.
*H04L 12/50* (2006.01)
*H04W 72/04* (2009.01)

(52) U.S. Cl.
CPC ... *H04W 72/0453* (2013.01); *H04W 72/0486* (2013.01)

(58) Field of Classification Search
CPC ............... H04W 72/1294; H04M 7/0063
USPC ............................................. 370/230
See application file for complete search history.

(56) References Cited

U.S. PATENT DOCUMENTS

| | | | |
|---|---|---|---|
| 2013/0237260 A1* | 9/2013 | Lin | H04B 1/525 455/501 |
| 2016/0027112 A1* | 1/2016 | Smith | G06Q 40/04 705/37 |

* cited by examiner

*Primary Examiner* — Dang Ton (57) ABSTRACT

Disclosed is a method and system for managing carriers on which a wireless communication system serves a UE. As disclosed, the system serves the UE on a set of one or more carriers. While serving the UE on the set of one or more carriers, the system determines that the UE should additionally be served on at least one other carrier. The system then selects the at least one other carrier, from a set of candidate carriers, based at least in part on the at least one other carrier being closest, of the set of candidate carriers, in the frequency spectrum to the set of one or more carriers. Based on the selecting, the system then adds the selected at least one other carrier to the set of one or more carriers to establish a modified set of carriers and serves the UE on the modified set of carriers.

20 Claims, 8 Drawing Sheets

METHOD AND SYSTEMS FOR SELECTION OF A SECONDARY CARRIER

BACKGROUND

Unless otherwise indicated herein, the description provided in this section is not itself prior art to the claims and is not admitted to be prior art by inclusion in this section.

A typical cellular wireless network includes a number of base stations each radiating to define a respective coverage area in which user equipment devices (UEs) such as cell phones, tablet computers, tracking devices, embedded wireless modules, and other wirelessly equipped communication devices, can operate. In particular, each coverage area may operate on one or more carriers each defining a respective frequency bandwidth of coverage. In turn, each base station may be coupled with network infrastructure that provides connectivity with one or more transport networks, such as the public switched telephone network (PSTN) and/or the Internet for instance. With this arrangement, a UE within coverage of the network may engage in air interface communication with a base station and may thereby communicate via the base station with various remote network entities or with other UEs served by the base station.

Further, a cellular wireless network may operate in accordance with a particular air interface protocol or "radio access technology," with communications from the base stations to UEs defining a downlink or forward link and communications from the UEs to the base stations defining an uplink or reverse link. Examples of existing air interface protocols include, without limitation, Orthogonal Frequency Division Multiple Access (OFDMA (e.g., Long Term Evolution (LTE)), Code Division Multiple Access (CDMA) (e.g., 1×RTT and 1×EV-DO), Wireless Interoperability for Microwave Access (WiMAX), and Global System for Mobile Communications (GSM), among others. Each protocol may define its own procedures for registration of UEs, initiation of communications, handover between coverage areas, and other functions related to air interface communication.

In accordance with a recent version of the LTE standard of the Universal Mobile Telecommunications System (UMTS), for instance, each coverage area of a base station may operate on one or more carriers spanning 1.4 MHz, 3 MHz, 5 MHz, 10 MHz, 15 MHz, or 20 MHz, with each carrier divided primarily into subcarriers spaced apart from each other by 15 kHz. Further, the air interface is divided over time into a continuum of 10-millisecond frames, with each frame being further divided into ten 1-millisecond sub frames or transmission time intervals (TTIs) that are in turn each divided into two 0.5-millisecond segments. In each 0.5 millisecond segment or in each 1 millisecond TTI, the air interface is then considered to define a number of 12-subcarrier wide "resource blocks" spanning the frequency bandwidth (i.e., as many as would fit in the given frequency bandwidth). In addition, each resource block is divided over time into symbol segments of 67 μs each, with each symbol segment spanning the 12-subcarriers of the resource block and thus supporting transmission of symbols in "resource elements."

The LTE air interface then defines various channels made up of certain ones of these resource blocks and resource elements. For instance, on the downlink, certain resource elements across the bandwidth are reserved to define a physical downlink control channel (PDCCH) for carrying control signaling from the base station to UEs, and other resource elements are reserved to define a physical downlink shared channel (PDSCH) for carrying bearer data transmissions from the base station to UEs. Likewise, on the uplink, certain resource elements across the bandwidth are reserved to define a physical uplink control channel (PUCCH) for carrying control signaling from UEs to the base station, and other resource elements are reserved to define a physical uplink shared channel (PUSCH) for carrying bearer data transmissions from UEs to the base station.

In a system arranged as described above, when a UE enters into coverage of a base station, the UE may engage in attach signaling with the base station, by which the UE would register to be served by the base station on a particular carrier. Through the attach process and/or subsequently, the base station and supporting LTE network infrastructure may establish for the UE one or more bearers, essentially defining logical tunnels for carrying bearer data between the UE and a transport network such as the Internet.

Once attached with the base station, a UE may then operate in a "connected" mode in which the base station may schedule data communication to and from the UE on the UE's established bearer(s). In particular, when a UE has data to transmit to the base station, the UE may transmit a scheduling request to the base station, and the base station may responsively allocate one or more upcoming resource blocks on the PUSCH to carry that bearer traffic and transmit on the PDCCH to the UE a downlink control information (DCI) message that directs the UE to transmit the bearer traffic in the allocated resource blocks, and the UE may then do so. Likewise, when the base station has bearer traffic to transmit to the UE, the base station may allocate PDSCH resource blocks to carry that bearer traffic and may transmit on the PDCCH to the UE a DCI message that directs the UE to receive the bearer traffic in the allocated resource blocks, and the base station may thus transmit the bearer traffic in the allocated resource blocks to the UE. LTE also supports uplink control signaling on the PUCCH using uplink control information (UCI) messages. UCI messages can carry scheduling requests from UEs, requesting the base station to allocate PUSCH resource blocks for uplink bearer data communication.

In some systems, when a UE is attached with a base station on a particular carrier (e.g., pair of downlink carrier and uplink carrier), the base station provides DCIs to the UE on the PDCCH of that carrier and schedules downlink communication of bearer data to the UE on the PDSCH of that carrier. In other systems, however, a revision of LTE known as LTE-Advanced may permit a base station to serve a UE with "carrier aggregation," by which the base station schedules bearer communication with one or more UEs on multiple carriers at a time. With carrier aggregation, multiple carriers from either contiguous frequency bands or non-contiguous frequency bands can be aggregated to increase the bandwidth available to the UE. Currently, the maximum bandwidth for a data transaction between a base station and a UE using a single carrier is 20 MHz. Using carrier aggregation, a base station may increase the maximum bandwidth to up to 100 MHz by aggregating up to five carriers.

When carriers are aggregated, each carrier may be referred to as a component carrier. Of the component carriers, one may be a primary carrier (or "PCell") and the others may be secondary carriers (or "SCells"). The primary carrier may be the carrier that the UE receives with the strongest signal (e.g., the carrier on which the UE is attached). However, other factors may be taken into account as well, or instead of, signal strength when assigning a primary carrier. With carrier aggregation, a base station may provide a DCI message to a UE on the primary carrier, but may use that DCI message to schedule downlink communication of bearer data to the UE on two or more carriers at time, such as on both the PDSCH of the UE's primary carrier and the PDSCH of one or more secondary carriers. Alternatively, the base station may provide DCI messages on multiple carriers concurrently to schedule concurrent PDSCH communication on the multiple carriers.

OVERVIEW

When a UE is attached with a base station, the base station may serve the UE on a base set of one or more carriers that are each positioned along some portion of the frequency spectrum. For instance, the base station may serve the UE on a single base carrier without carrier aggregation. Alternatively, the base station may serve the UE on multiple carriers with carrier aggregation. In a carrier aggregation scenario, the carriers in the set may be contiguous with each other or may be non-contiguous with each other.

In either case, the base station may sometimes add carriers to the base set of one or more carriers on which the base station is serving the UE, such as for the purpose of further increasing the bandwidth available to the UE. If the base set includes a single base carrier, the base station may add a carrier onto the base set and then serve the UE with carrier aggregation using a modified set of carriers that includes the base carrier and the added carrier. In contrast, if the base station is already serving the UE with carrier aggregation on a base set of multiple carriers, an added carrier may define an additional secondary carrier on which the base station could serve the UE. In this case, addition of a carrier results in a modified set of carriers that includes the multiple carriers of the base set as well as the added secondary carrier. After addition of the secondary carrier, the base station can then serve the UE with carrier aggregation on the modified set of carriers.

In practice, serving a UE with carrier aggregation may work well to increase the bandwidth available to the UE. However, issues can arise in a situation where the various carriers on which a base station operates to serve the UE have substantially different propagation characteristics and therefore do not all equally cover the location where the UE is currently located. Such differences in propagation characteristics can arise when carrier frequencies on which the base station operates to serve the UE are substantially different. For instance, transmissions on lower carrier frequencies tend to propagate longer distances relative to transmissions on higher carrier frequencies (e.g., assuming that the signals are transmitted with substantially similar transmission powers). As a result, the scope of a coverage area in a wireless communication system is defined by propagation distances of the carrier frequencies on which one or more UEs are being served.

In some cases, a carrier frequency of an added carrier may be substantially higher or substantially lower relative to carrier frequencies of the base set of one or more carriers on which the base station was already serving the UE. In cases where the carrier frequency of the added carrier is substantially higher, transmissions on the added carrier may not extend to have the same scope of coverage as transmissions on the base set of one or more carriers on which the base station was already serving the UE. This may result in the coverage area of the added carrier being smaller than the coverage area of the base set of one or more carriers. As a result, if the UE is operating at or near the edge of the coverage area defined by the base set of one or more carriers, the UE may be outside of the coverage area defined by the added carrier and may thus not be capable of communicating on the added carrier. Therefore, addition of a carrier having a carrier frequency that is substantially higher relative to carrier frequencies of the base set of one or more carriers may not be advantageous.

Further, in cases where the carrier frequency of the added carrier is substantially lower, transmissions on the added carrier may extend beyond the coverage scope of transmissions on the base set of one or more carriers on which the base station was already serving the UE. This may result in a coverage area of the added carrier exceeding the coverage area of the base set of one or more carriers. As a result, the added propagation distance could cause interference with adjacent coverage areas. This interference could give rise to network management issues because, when two adjacent coverage areas operate on the same frequency as each other, communications in one coverage area may interfere with communications in the other coverage area. This can greatly impact performance of UEs that are positioned at an area of overlap between the two coverage areas. Therefore, addition of a carrier having a carrier frequency that is substantially lower relative to carrier frequencies of the base set of one or more carriers may also not be advantageous.

Disclosed herein is an arrangement to help overcome problems resulting from addition of a carrier having propagation characteristics that are substantially different from propagation characteristics of a base set of one or more carriers on which a UE is being served. In accordance with the disclosure, a wireless communication system may select a carrier to add, from a set of one or more candidate carriers, based on consideration of how close the carrier is along the frequency spectrum to the base set of one or more carriers on which the UE is being served.

In particular, the wireless communication system can determine the position along the frequency spectrum of each candidate carrier relative to the position along the frequency spectrum of the base set of one or more carriers on which a UE is being served. For instance, the system may determine a measure of proximity between a reference frequency of the base set to a frequency of a candidate carrier. Once the system determines proximity along the frequency spectrum of each candidate carrier to the base set of one or more carriers on which a UE is being served, the system can then select a carrier to add based on the carrier being most proximate along the frequency spectrum to the base set of one or more carriers.

Accordingly, disclosed herein is a method operable in a wireless communication system including a base station that radiates to provide wireless coverage in which to serve UEs. The base station is configured to provide service within a frequency spectrum that includes a plurality of carriers, each carrier defining a respective range of frequency within the frequency spectrum. In accordance with the method, the wireless communication system serves a UE on a set of one or more carriers from the plurality of carriers. While serving the UE on the set of one or more carriers, the wireless communication system determines that the wireless communication system should serve the UE on at least one other carrier in addition to serving the UE on the set of one or more carriers.

The wireless communication system then selects the at least one other carrier, from a set of candidate carriers, based at least in part on the at least one other carrier being closest, of the set of candidate carriers, in the frequency spectrum to the set of one or more carriers. Based on the selecting, the wireless communication system adds the selected at least one other carrier to the set of one or more carriers to establish a modified set of carriers. The wireless communication system then serves the UE on the modified set of carriers.

Additionally, disclosed herein is a wireless communication system including a base station that radiates to provide wireless coverage in which to serve UEs. The base station is configured to provide service within a frequency spectrum that includes a plurality of carriers, each carrier defining a respective range of frequency within the frequency spectrum. The wireless communication system also includes a controller that may be separate from the base station or may be part of the base station. The controller configured to cause the base station to perform operations.

The operations include serving a UE on a set of one or more carriers from the plurality of carriers. The operations also include, while serving the UE on the set of one or more carriers, determining that the wireless communication system should serve the UE on at least one other carrier in addition to serving the UE on the set of one or more carriers. The operations additionally include selecting the at least one other carrier, from a set of candidate carriers, based at least in part on the at least one other carrier being closest, of the set of candidate carriers, in the frequency spectrum to the set of one or more carriers. The operations further include, based on the selecting, adding the selected at least one other carrier to the set of one or more carriers to establish a modified set of carriers. The operations yet further include causing the wireless communication system to serve the UE on the modified set of carriers.

Further, in another respect, disclosed is a non-transitory computer-readable medium having stored thereon instructions executable by a processor to cause a wireless communication system to carry out functions such as those noted above, to facilitate selection of a secondary carrier.

These as well as other aspects, advantages, and alternatives will become apparent to those of ordinary skill in the art by reading the following detailed description, with reference where appropriate to the accompanying drawings. Further, it should be understood that the descriptions provided in this overview and below are intended to illustrate the invention by way of example only and not by way of limitation.

DETAILED DESCRIPTION

The present method and system will be described herein in the context of LTE. However, it will be understood that principles of the disclosure can extend to apply in other scenarios as well, such as with respect to other air interface protocols. Further, even within the context of LTE, numerous variations from the details disclosed herein may be possible. For instance, elements, arrangements, and functions may be added, removed, combined, distributed, or otherwise modified. In addition, it will be understood that functions described here as being performed by one or more entities may be implemented in various ways, such as by a processor executing software instructions for instance.

Figure 1:
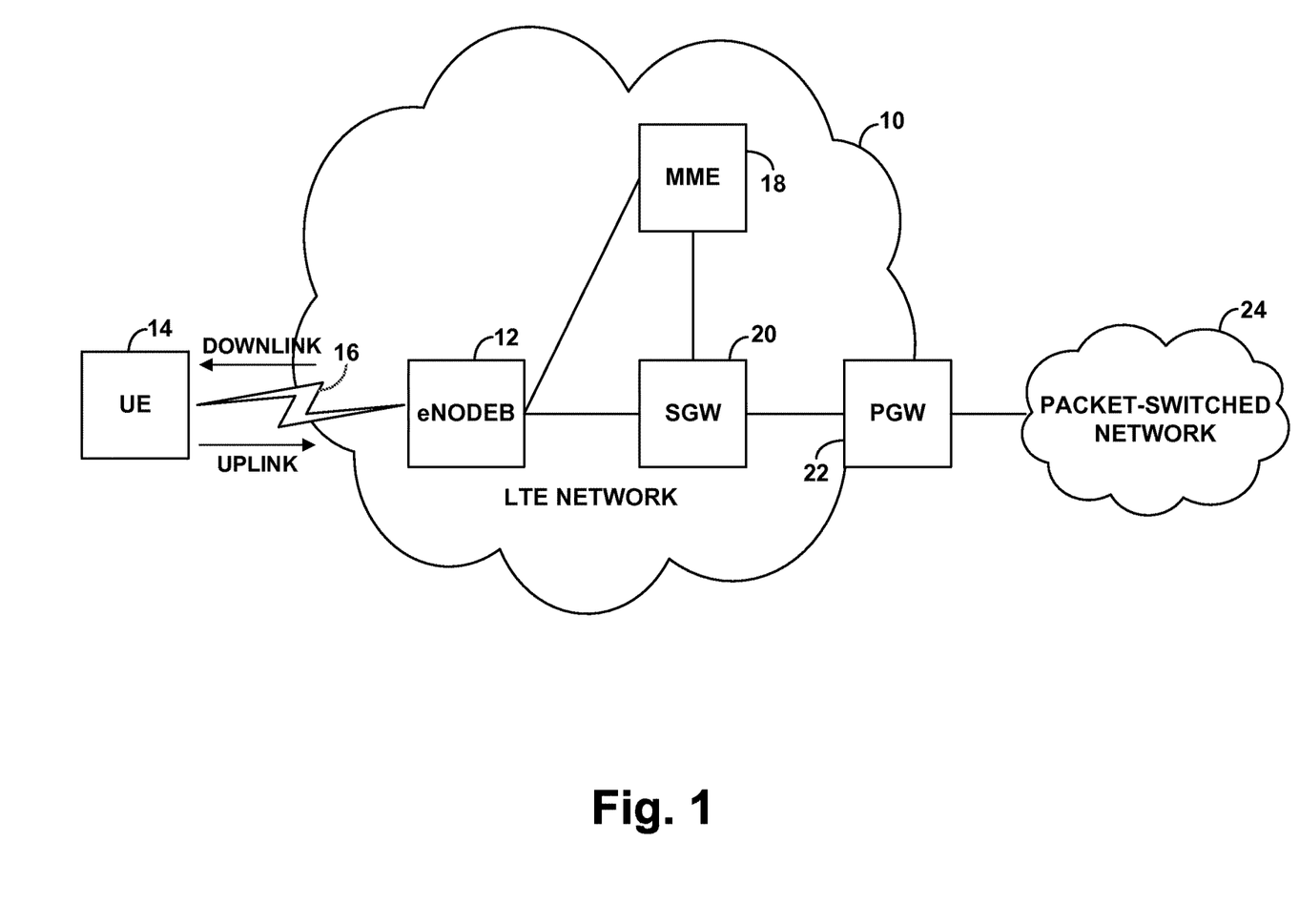
FIG. 1 is a simplified block diagram of a wireless communication system in which the present method can be implemented.

Referring to the drawings, FIG. 1 is a simplified block diagram of a wireless communication system in which the present method can be implemented. In particular, FIG. 1 depicts a representative LTE network 10, which functions primarily to serve UEs with wireless packet data communication service, including possibly voice over Internet Protocol (VoIP) service, but may also provide other functions. As shown, the LTE network 10 includes at least one example LTE macro base station known as an eNodeB 12, which has an antenna structure and associated equipment for providing an LTE coverage area in which to serve UEs such as an example UE 14. More specifically, the eNodeB 12 radiates to define a wireless air interface 16 through which the eNodeB 12 may communicate with one or more served UEs, such as UE 14, via the downlink and the uplink.

A base station (such as eNodeB 12) may operate to serve UEs on one or more carriers that may each span some frequency bandwidth. In particular, the base station may transmit bearer data and/or control signaling (e.g., to a UE) on a set of air interface resources reserved to define a downlink frequency channel. Additionally, the base station may receive bearer data and/or control signaling (e.g., from a UE) on a set of air interface resources reserved to define an uplink frequency channel. Moreover, the base station in a wireless communication system can take various forms. For instance, the base station could be a macro base station operated by a wireless carrier to provide a broad range of coverage and may thus include a tall antenna tower and a power amplifier for providing high transmission power. Alternatively, the base station could be a small cell base station ("small cell"), such as a femtocell, typically having a much smaller form factor and operating at lower transmission power for providing a smaller range of coverage.

As shown in FIG. 1, the eNodeB 12 has a communication interface with a Mobility Management Entity (MME) 18. The MME 18 can function as a signaling controller for the LTE network 10. Further, the eNodeB 12 has a communication interface with a serving gateway (SGW) 20, which in turn has a communication interface with a packet-data network gateway (PGW) 22 that provides connectivity with a packet-switched network 24, and the MME 18 has a communication interface with the SGW 20. In particular, the eNodeB 12 may be communicatively linked with a core network, which may be operated by a wireless service provider. The core network then provides connectivity with one or more MMEs, such as MME 18, as well as one or more gateways such as SGW 20 and PGW 22.

Figure 2:
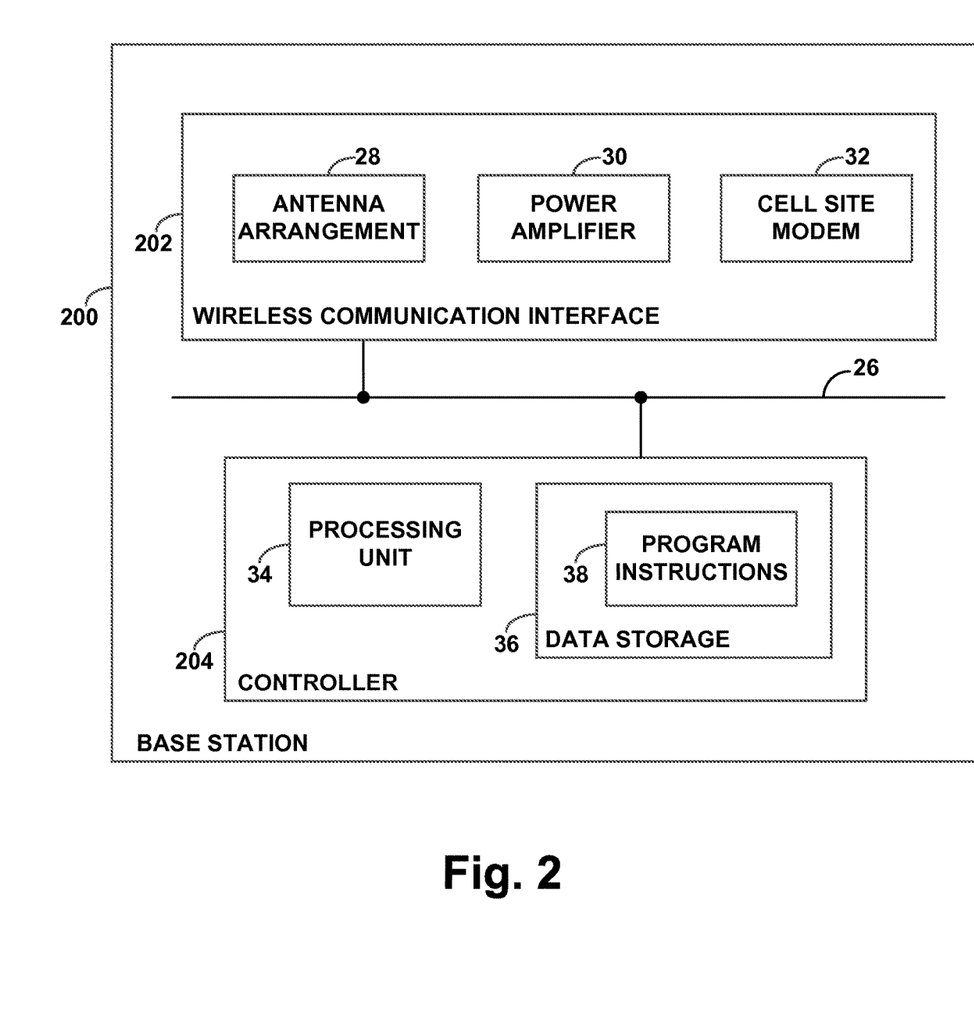
FIG. 2 is a simplified block diagram of a base station in which the present method can be implemented.

FIG. 2 is next a simplified block diagram of a representative base station 200 such as eNodeB 12, illustrating some of the components that can be included in such an entity. As shown in FIG. 2, the representative base station 200 may include a wireless communication interface 202 and a controller 204. As shown, these components of the base station 200 may be communicatively linked together by a system bus, network, or other connection mechanism 26. Alternatively, they may be integrated together in various ways.

As shown, wireless communication interface 202 may include an antenna arrangement (i.e., antenna structure) 28, which may be tower mounted, and associated components such as a power amplifier 30 and a cell site modem 32 for engaging in air interface communication with UEs via the antenna arrangement 28, so as to transmit data and control information to the UEs and receive data and control information from the UEs. In practice, the power amplifier 30 may have a maximum transmission power that the base station 200 can use for transmission across the downlink at any given time.

The base station 200 may also include a controller 204 that is arranged to manage or carry out various functions such as those discussed herein. As shown, the controller 204 may include processing unit 34 and data storage 36. Processing unit 34 may then comprise one or more general purpose processors (e.g., microprocessors) and/or special-purpose processors (e.g., digital signal processors and/or application specific integrated circuits) and may be integrated in whole or in part with the wireless communication interface 202. And data storage 36 may include one or more volatile and/or non-volatile storage components, such as magnetic, optical, flash, or other types of non-transitory computer readable media, and may be integrated in whole or in part with processing unit 34.

As shown, data storage 36 may hold (have encoded thereon) program instructions 38, which may be executable by processing unit 34 to carry out various controller functions. As such, the processing unit 34 programmed with instructions 38 may define part or all of a controller for controlling operation of the base station 200. Alternatively or additionally, however, such control functionality could be provided external to the base station 200, in another entity (e.g., separate from the base station 200) such as by a base station control entity (e.g., MME 18), which may be communicatively linked with the base station and may serve to control certain aspects of base station operation generally.

Figure 3:
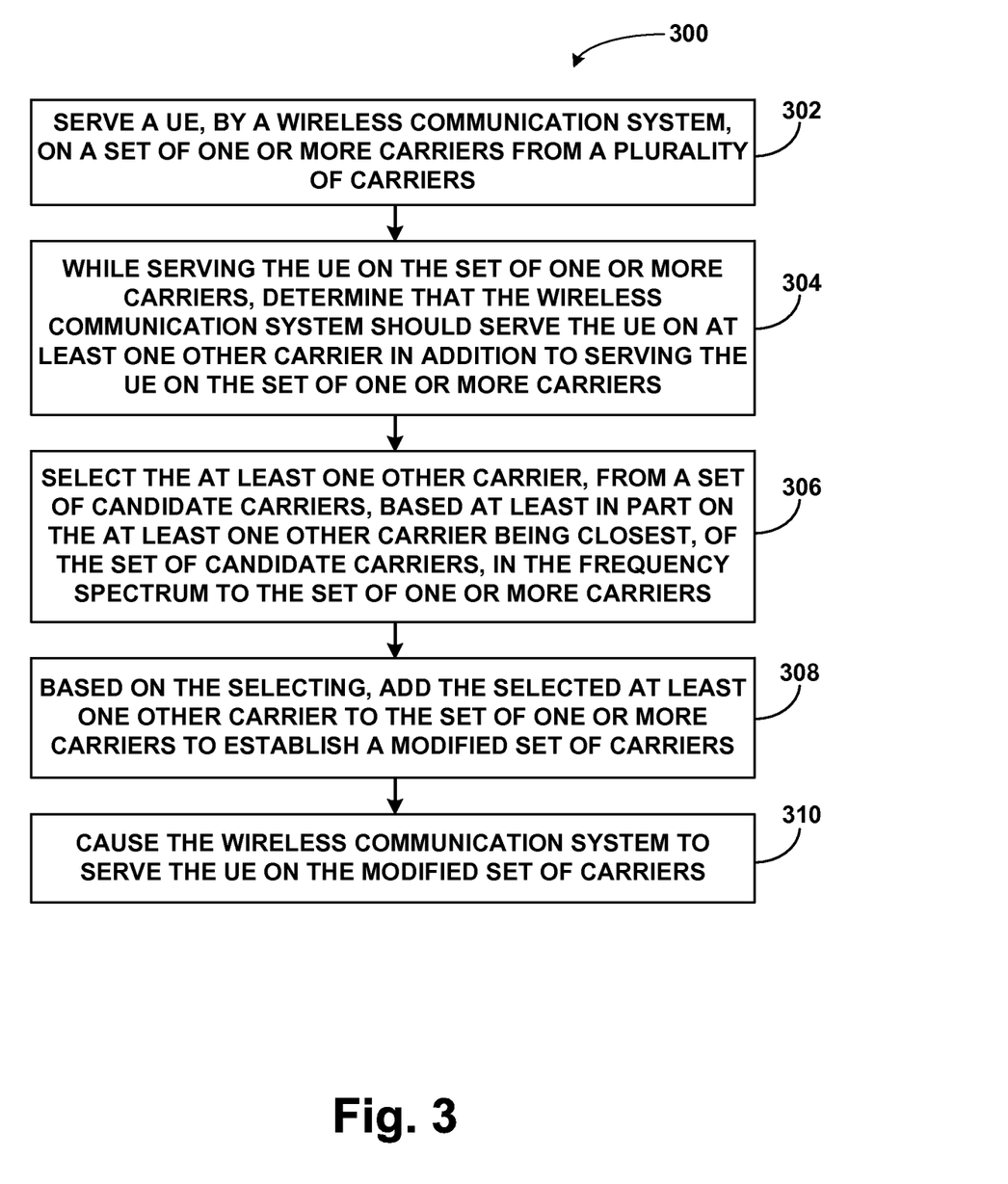
FIG. 3 is a flowchart illustrating a method for selection of a carrier, in accordance with an example embodiment.

FIG. 3 is a flowchart illustrating a method 300, according to an example embodiment. Illustrative methods, such as method 300, may be carried out in whole or in part by component(s) and/or arrangement(s) in a wireless communication system, such as by the one or more of the components of the representative LTE network 10 shown in FIG. 1 and/or with one or more of the components of the base station 200 shown in FIG. 2. However, it should be understood that example methods, such as method 300, may be carried out by other entities or combinations of entities as well as in other arrangements, without departing from the scope of the disclosure.

In particular, method 300 may be operable in a wireless communication system that includes a base station (e.g., eNodeB 12) that radiates to provide wireless coverage in which to serve UEs. The base station is configured to provide service within a frequency spectrum that includes a plurality of carriers, each carrier defining a respective range of frequency within the frequency spectrum. For example, each coverage area of a base station may operate on one or more carriers spanning 1.4 MHz, 3 MHz, 5 MHz, 10 MHz, 15 MHz, or 20 MHz. Note that the frequency spectrum may define representation of signals in the frequency domain, such as for analysis of signal strength of a channel versus frequency for example.

As shown by block 302 in FIG. 3, method 300 involves the wireless communication system serving a UE on a set of one or more carriers from the plurality of carriers. At block 304, method 300 then involves, while serving the UE on the set of one or more carriers, the wireless communication system determining that the wireless communication system should serve the UE on at least one other carrier in addition to serving the UE on the set of one or more carriers. At block 306, method 300 then involves the wireless communication system selecting the at least one other carrier, from a set of candidate carriers, based at least in part on the at least one other carrier being closest, of the set of candidate carriers, in the frequency spectrum to the set of one or more carriers. At block 308, method 300 then involves, based on the selecting, the wireless communication system adding the selected at least one other carrier to the set of one or more carriers to establish a modified set of carriers. Finally, at block 310, method 300 then involves causing the wireless communication system to serve the UE on the modified set of carriers.

As discussed above, in accordance with LTE, when the UE 14 enters into coverage of the eNodeB 12, the UE 14 and LTE network 10 may engage in an initial attach process. Through the initial attach process and/or subsequently, the LTE network may establish for the UE 14 one or more bearers extending between the UE 14 and the PGW 22, for carrying data communications between the UE 14 and the packet-switched network 24. This establishment of bearers may be initiated by the UE 14 or may be initiated by the LTE network 10. An initial setup of one or more bearers for the UE 14 may involve establishing for each bearer a respective virtual tunnel that includes a radio-link tunnel extending between the UE 14 and the eNodeB 16 and a backhaul tunnel extending between the eNodeB 12 and the PGW 22 via the SGW 20.

Further, the process may involve establishing for the UE 14 a logical "Radio Resource Control" (RRC) connection encompassing the one or more radio-link portions. Thus, in the event such an RRC connection is not already established, UE 14 sends an RRC Connection Request message to eNodeB 12. The RRC Connection Request message may include an identifier of UE 14 (e.g., a Globally Unique Temporary ID (GUTI)). In response, eNodeB 12 may send to UE 14 an RRC Connection Setup message to indicate that the network recognizes UE 14 and that the network is able to provide network services. UE 14 may then send to eNodeB 12 an RRC Connection Setup Complete message 326 to acknowledge establishment of the RRC connection.

At a later point in time, in some scenarios, the UE 14 may transition from an RRC "connected" mode to an RRC "idle" mode in which the UE 14 does not have a radio-link layer connection. However, in such scenarios, the UE 14 can trigger reassignment of an RRC connection and thereby transition back into the RRC connected mode.

When an RRC connection is established or modified, the eNodeB 12 can specify one or more carriers to be used to serve the UE 14. To specify the one or more carriers, the eNodeB 12 may send an RRC connection configuration message to the UE 14 when establishing the RRC connection or the eNodeB 12 may send an RRC connection reconfiguration message when the RRC connection is being modified. In particular, the RRC connection configuration (or reconfiguration) message may identify the UE 14 (e.g., using the GUTI) and may direct the UE 14 to operate on a base set of one or more carriers. Moreover, the RRC connection configuration (or reconfiguration) message may identify the particular carriers in the base set of one or more carriers, such as by specifying the corresponding frequency ranges of the carriers.

As noted above, the base station could serve the UE on a single base carrier without carrier aggregation. Alternatively, the base station could serve the UE on multiple carriers with carrier aggregation. In the case of carrier aggregation, the RRC connection configuration (or reconfiguration) message may designate one component carrier as a primary carrier and the remaining component carriers as secondary carriers. The eNodeB 12 may carry out this designation by assigning an ID number corresponding to each component carrier on which the UE 14 should be served such that the eNodeB 12 and/or the UE 14 can refer to specific component carriers, using the ID number, during transmissions. For instance, an ID number of 0 may designate the primary carrier while ID numbers ranging between 1 and 7 may designate the secondary carriers. After receiving the RRC connection configuration (or reconfiguration) message, the UE 14 may then be set to monitor transmissions on the designated base set of one or more carriers.

Figure 4A:
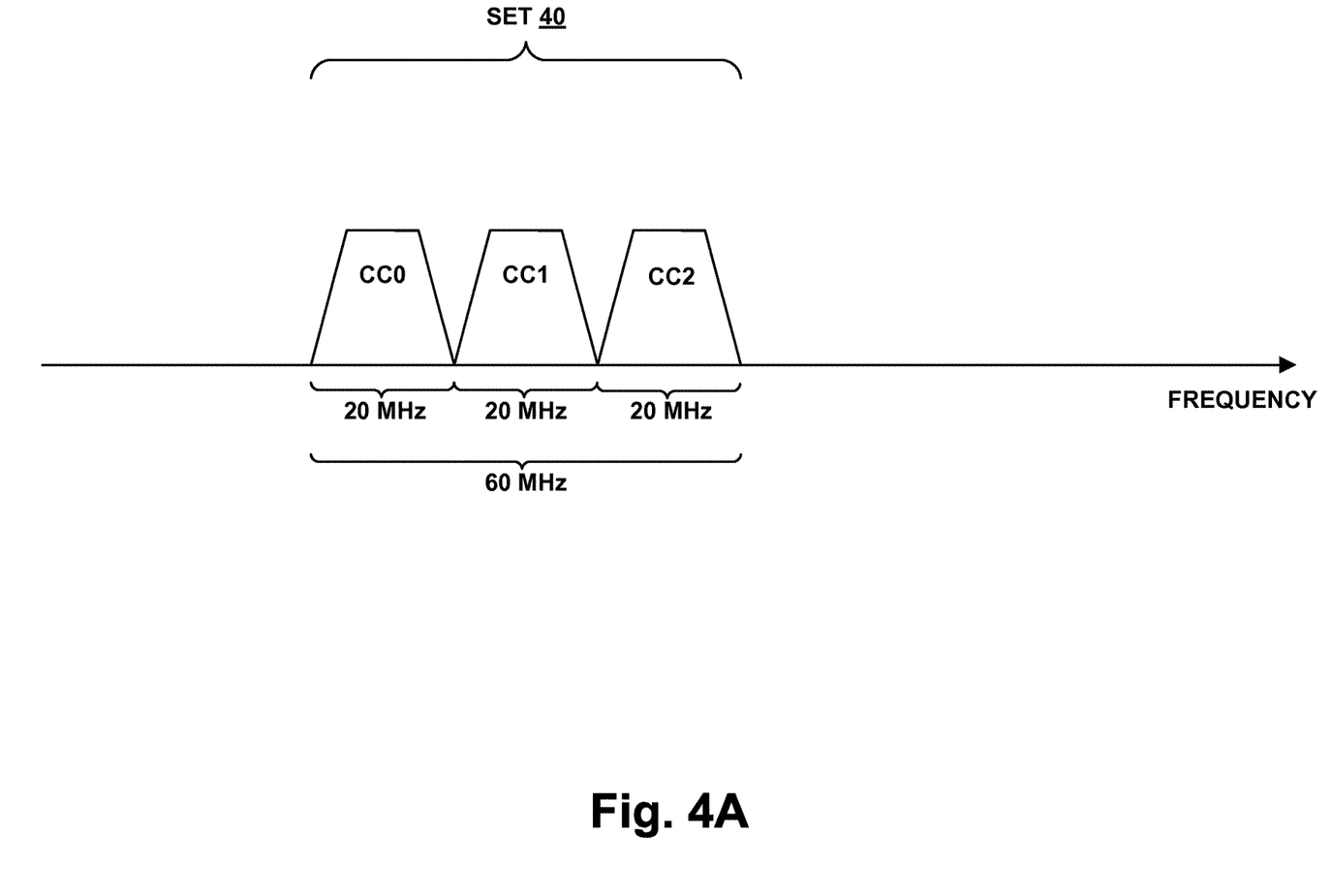
FIGS. 4A-4E are illustrations depicting example selection of a carrier, in accordance with an example embodiment.

FIG. 4A depicts an example set 40 of component carriers on which the wireless communication system can serve the UE 14 in a carrier aggregation scenario. The set 40 includes primary component carrier CC0 and two secondary component carriers CC1 and CC2. As shown, the component carriers CC0, CC1, and CC2 are contiguous with each other. Additionally, each component carrier in this example spans a bandwidth of 20 MHz, thereby amounting to a total aggregated bandwidth of 60 MHz.

The arrangement in FIG. 4A is shown for illustration purposes only and is not meant to be limiting. Other example arrangements may include at least some component carriers that are non-contiguous with each other. Also, other example arrangements may include at least some component carriers having different respective bandwidths. Further, a wireless communication system may also carry out subsequent steps of method 300 (e.g., blocks 304-310) when the system serves the UE on a single base carrier in contrast to serving the UE with carrier aggregation on multiple carriers as depicted in FIG. 4A. Other arrangements may also be possible. Note that contiguous carriers may define carriers that are adjacent with each other but may or may not share a common border (e.g., common frequency), while non-contiguous carriers may define carriers that are not adjacent with each other.

As noted above, method 300 involves, while serving the UE on the set of one or more carriers (e.g., set 40), the wireless communication system determining that the wireless communication system should serve the UE on at least one other carrier in addition to serving the UE on the set of one or more carriers. In an example implementation, the wireless communication system may seek to add a carrier to a base set of one or more carriers, such as for the purpose of further increasing the bandwidth available to a served UE. The system can determine that a carrier should be added based on various factors. Several example factors are discussed below. However, other factors may also be possible without departing from the scope of the disclosure.

In one example, the wireless communication system can determine capacity demand of the served UE 14. For instance, the system can determine the extent of air interface resources that the eNodeB 12 needs in order to transmit bearer data to the UE 14. The wireless communication system can also determine available capacity of the base set of one or more carriers (e.g., set 40) on which the UE 14 is being served. For instance, the system can determine the extent of air interface resources in the set 40 that are available (e.g., unused resources) for transmitting the bearer data to the UE 14.

Subsequently, the wireless communication system may determine whether the capacity demand of the served UE 14 exceeds (or is close to exceeding) available capacity of the set 40. If the wireless communication system determines that the capacity demand of the served UE 14 does not exceed the available capacity of the set 40, the system may use the available capacity to carry out the transmission. However, if the wireless communication system determines that the capacity demand of the served UE 14 exceeds the available capacity of the set 40, the system may determine that at least one other carrier (e.g., a secondary carrier) should be added to the set 40 such that available capacity is increased.

In another example, the wireless communication system can determine threshold loading of the base set of one or more carriers (e.g., set 40) on which the UE 14 is being served. The system can make this determination with or without consideration of the capacity demand discussed above. That is, since carrier aggregation allows the eNodeB 12 to allocate resources to various UEs on multiple carriers of the set 40 at once, the load corresponding to the set 40 may sometimes be relatively high even if capacity demand of the served UE 14 is relatively low. As such, the system can determine that at least one other carrier should be added to the set 40 based on a load of the set 40 (or a load of at least one component carrier in the set 40) exceeding the threshold load.

A wireless communication system can define threshold loading in one of various ways. In one case, the wireless communication system can make a determination that the set 40 is threshold loaded based on an evaluation of a number of used resource elements in the set 40 relative to a total number of resource elements in the set 40. In particular, if the number of used resource elements equals (or is close to equaling) the total number of resource elements in the set 40, the wireless communication system may determine that the set 40 is threshold loaded. For example, exceeding a threshold load may involve using over 95% of the total number of resource elements. As such, if the set 40 includes 100 resource elements, the wireless communication system may make a determination of threshold loading when 95 of the resource elements are used or about to be used. Note that resource elements that are about to be used may involve, for instance, resource elements that the base station has allocated or scheduled to carry transmission at a future point in time.

In another case, the wireless communication system can make a determination that the set is threshold loaded based on an evaluation of the percentage of the total frequency bandwidth being used (or about to be used). In particular, if the percentage exceeds a threshold percentage, the wireless communication system may determine that the set 40 is threshold loaded. For example, exceeding a threshold load may involve using over 80% of the total frequency bandwidth. As such, if the frequency bandwidth of the set 40 spans 60 MHz (as shown in FIG. 4A), the wireless communication system may make a determination of threshold loading when 48 MHz of the 60 kHz are used (or about to be used). Other cases and examples may also be possible.

As noted above, method 300 involves the wireless communication system selecting the at least one other carrier, from a set of candidate carriers, based at least in part on the at least one other carrier being closest, of the set of candidate carriers, in the frequency spectrum to the set of one or more carriers. Once a determination is made that the wireless communication system should serve the UE 14 on at least one other carrier in addition to serving the UE 14 on the base set of one or more carriers (or perhaps before or concurrent with making that determination), the system may select the at least one other carrier to add to the base set of one or more carriers. To facilitate this in an example implementation, the wireless communication system may first determine a set of candidate carriers from which the system will select the at least one other carrier. For instance, the wireless communication system may obtain information from data storage 36 (or from other network entities) in order to determine all the carriers on which the eNodeB 12 is configured (e.g., licensed) to serve UEs. The system may then define the set of candidate carriers to include all of those carriers (e.g., other than the component carriers CC0, CC1, CC2 on which the UE 14 is already being served).

Alternatively, the wireless communication system can use various factors to determine the specific carriers to be included in the set of candidate carriers rather than including all carriers on which the eNodeB 12 is configured to serve UEs. In particular, the wireless communication system can use information obtained from various network entities to carry out the determination of the specific carriers to be included in the set of candidate carriers. Such information may include: capacity associated with various carriers, channel quality of various carriers, and/or load on various carriers, among other possibilities.

In one example, the system may select the set of candidate carriers based on the candidate carriers having at least some predefined level of resource availability. In another example, the system may select the candidate carriers based on the candidate carriers having respective bandwidths that exceed a predefined threshold bandwidth. In yet another example, the system may select the candidate carriers based on the candidate carrier not being concurrently used to serve any other UEs. And in yet another example, the system may select candidate carriers based on the candidate carriers having channel quality exceeding a predefined threshold quality. Other examples may also be possible.

Figure 4B:
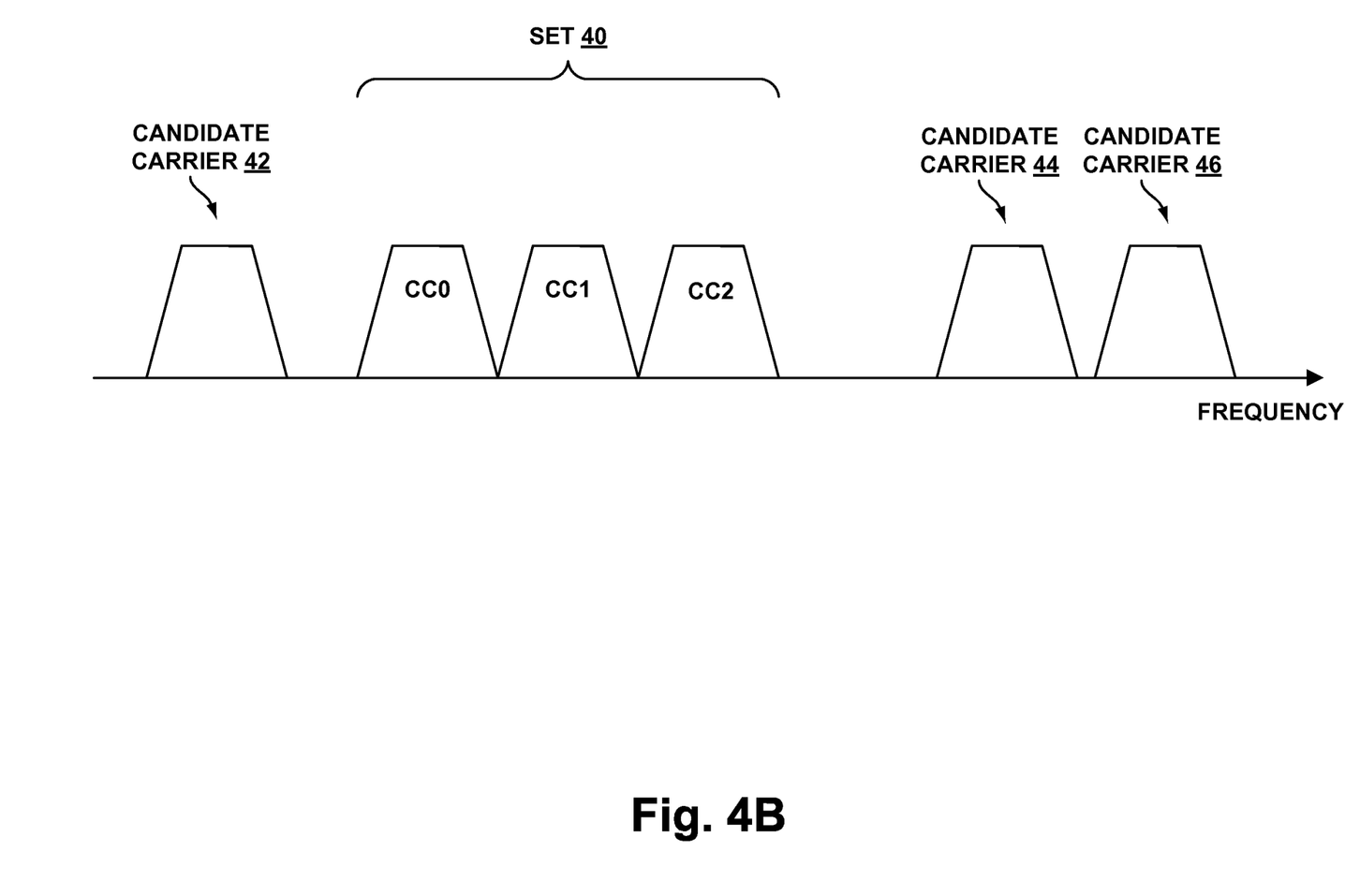

Each candidate carrier of the set of candidate carriers may be contiguous with one or more of the carriers of the base set of one or more carriers, or may be non-contiguous with each carrier of the base set. FIG. 4B depicts an example scenario in which each of the candidate carriers 42-46 is non-contiguous with the set 40. Further, in the illustrated arrangement, each candidate carrier is shown as having the same bandwidth as the component carriers in the set 40 (e.g., 20 MHz). However, other examples may involve at least some candidate carriers having different respective bandwidths.

Once the wireless communication system defines a set of candidate carriers, the system may select, from the set of candidate carriers, the at least one other carrier to add to the set 40. In an example implementation, the system may do this by selecting the candidate carrier that is the closest in the frequency spectrum to the set 40. The wireless communication system may define the candidate carrier being closest in the frequency spectrum to the set 40 based on proximity of (i) at least one frequency of the candidate carrier to (ii) at least one frequency of the set 40. The at least one frequency of the candidate carrier may be a center frequency of the candidate carrier or an edge frequency of the candidate carrier, among other possibilities. Additionally, the at least one frequency of the set 40 may be a center frequency of the set 40 or an edge frequency of the set 40, among other possibilities.

To carry out selection of the at least one other carrier, the wireless communication system may first determine proximity of each candidate carrier to the set 40. In one example, the wireless communication system may determine proximity of a candidate carrier to the set 40 by determining (e.g., calculating) an absolute difference between (i) at least one frequency of the candidate carrier and (ii) at least one frequency of the set 40. As an example, a center frequency of a candidate carrier may be 805 MHz while a center frequency of the set 40 may be 825 MHz. In this example, the absolute difference amounts to a 20 MHz separation along the frequency spectrum between the center frequency of the candidate carrier and the center frequency of the set 40.

In another example, the wireless communication system may include data storage (e.g., data storage 36) containing information related to proximity of some carriers to other carriers, information related to proximity between some carriers and various sets of carries, and/or information related to proximity between some sets of carriers to other set of carriers, among other possibilities. This information may take on one of various forms. For instance, this information may be in the form of a numerical representation of an absolute difference between (i) at least one frequency of a candidate carrier to (ii) at least one frequency of the set 40. Further, the information in data storage may be predefined, such as based on information entered by an operator or manufacturer of the system. Additionally or alternatively, this information may include previously determined proximities that have been stored by the system in data storage. In either case, the wireless communication system may obtain at least some information, such as information related to the carriers at issue, and use this information to define proximity of each candidate carrier to the set 40.

Once the wireless communication system has determined proximity of each carrier, the system may compare the determined proximities to determine a most proximate carrier from the set of candidate carriers. As an example, the determined proximities may be a set of determined absolute differences, each absolute difference corresponding to proximity of one of the candidate carriers to the set 40. The wireless communication system may then determine the most proximate carrier by determining the smallest absolute difference, from the set of absolute differences, and define the candidate carrier corresponding to the smallest absolute difference as the most proximate carrier. Subsequently, the wireless communication system may select the most proximate carrier as the at least one other carrier on which the wireless communication system should serve the UE 14.

Figure 4C:
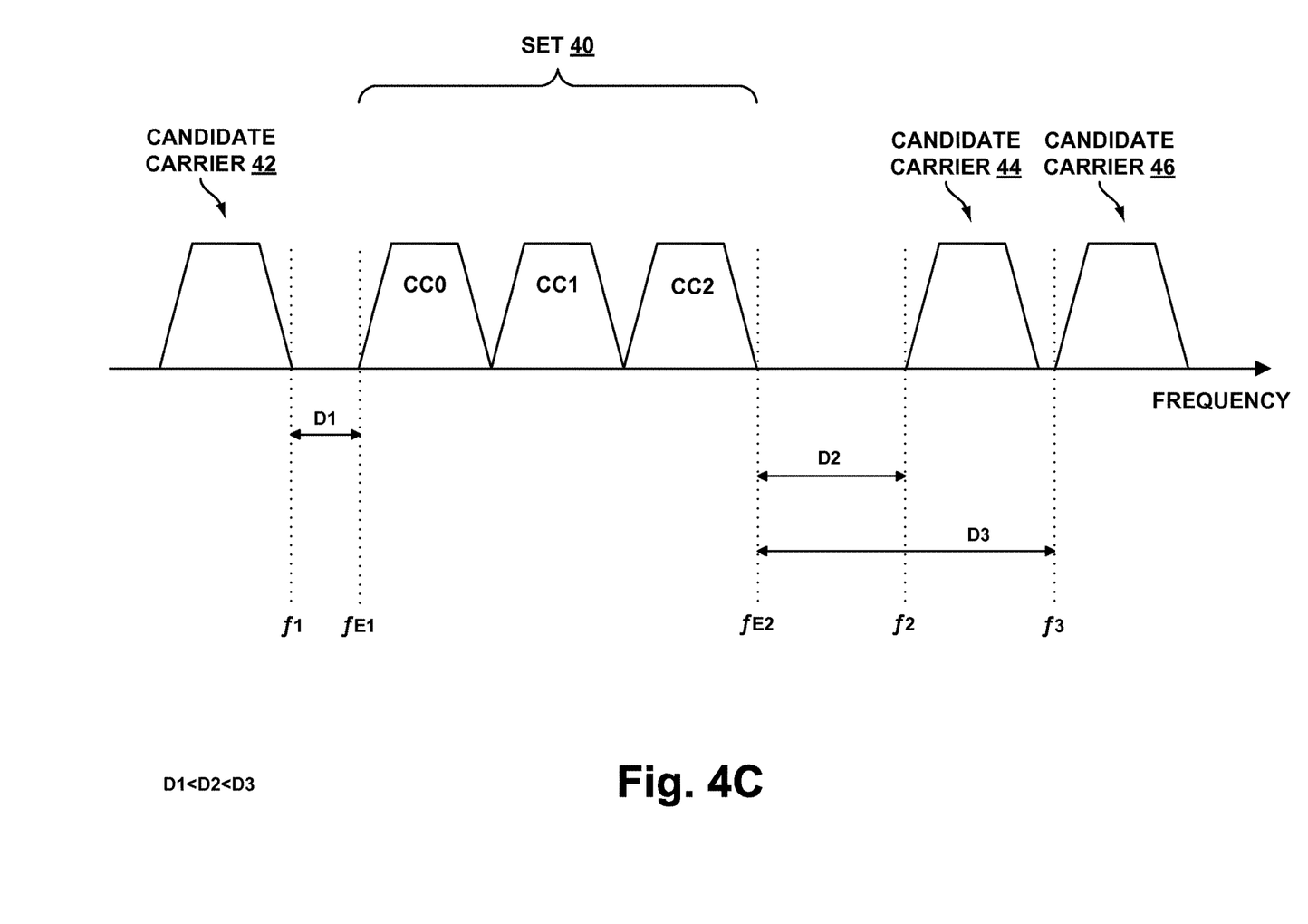

FIG. 4C next depicts an example comparison of determined proximities for the purpose of determining a most proximate carrier in this process. As shown, the set 40 has corresponding edge frequencies $f_{E1}$ and $f_{E2}$ ($f_{E2} > f_{E1}$), candidate carrier 42 has a corresponding edge frequency $f_1$, candidate carrier 44 has a corresponding edge frequency $f_2$, and candidate carrier 46 has a corresponding edge frequency $f_3$.

In an example implementation, the system may use the higher edge frequency of the set 40 (e.g., $f_{E2}$) when determining proximity of candidate carriers having higher respective frequencies relative to frequencies of the set 40 (e.g., candidate carriers 44-46) and the system may use the lower edge frequency of the set 40 (e.g., $f_{E1}$) when determining proximity of candidate carrier having lower respective frequencies relative to frequencies of the set 40 (e.g., candidate carrier 42). Moreover, for a candidate carrier having higher respective frequencies relative to frequencies of the set 40, the system may define the edge frequency as the lowest frequency of the candidate carrier (e.g., $f_2$ and $f_3$) and for a candidate carrier having lower respective frequencies relative to frequencies of the set 40, the system may define the edge frequency as the highest frequency of the candidate carrier (e.g., $f_1$). In this manner, the system can fairly determine proximity of the candidate carriers 42-46 regardless of the position of a candidate carrier relative to the set 40 and regardless of the specific frequencies (e.g., edge or center) used for the determination.

The system may determine the absolute difference corresponding to each candidate carrier. As shown, the absolute difference between the edge frequency $f_{E1}$ of the set 40 and the edge frequency $f_1$ of candidate carrier 42 is D1 (i.e., D1=$|f_{E1}-f_1|$), the absolute difference between the edge frequency $f_{E2}$ of the set 40 and the edge frequency $f_2$ of candidate carrier 44 is D2 (i.e., D2=$|f_{E2}-f_2|$), and the absolute difference between the edge frequency $f_{E2}$ of the set 40 and the edge frequency $f_3$ of candidate carrier 46 is D3 (i.e., D3=$|f_{E2}-f_3|$). The system may then determine the smallest absolute difference from among D1, D2, and D3. As illustrated, D1 is the smallest absolute difference from among D1, D2, and D3. As such, the system may determine that candidate carrier 42 is the most proximate carrier from the set including candidate carriers 42-46 and may select candidate carrier 42 as the at least one other carrier on which the wireless communication system should serve the UE 14.

Figure 4D:
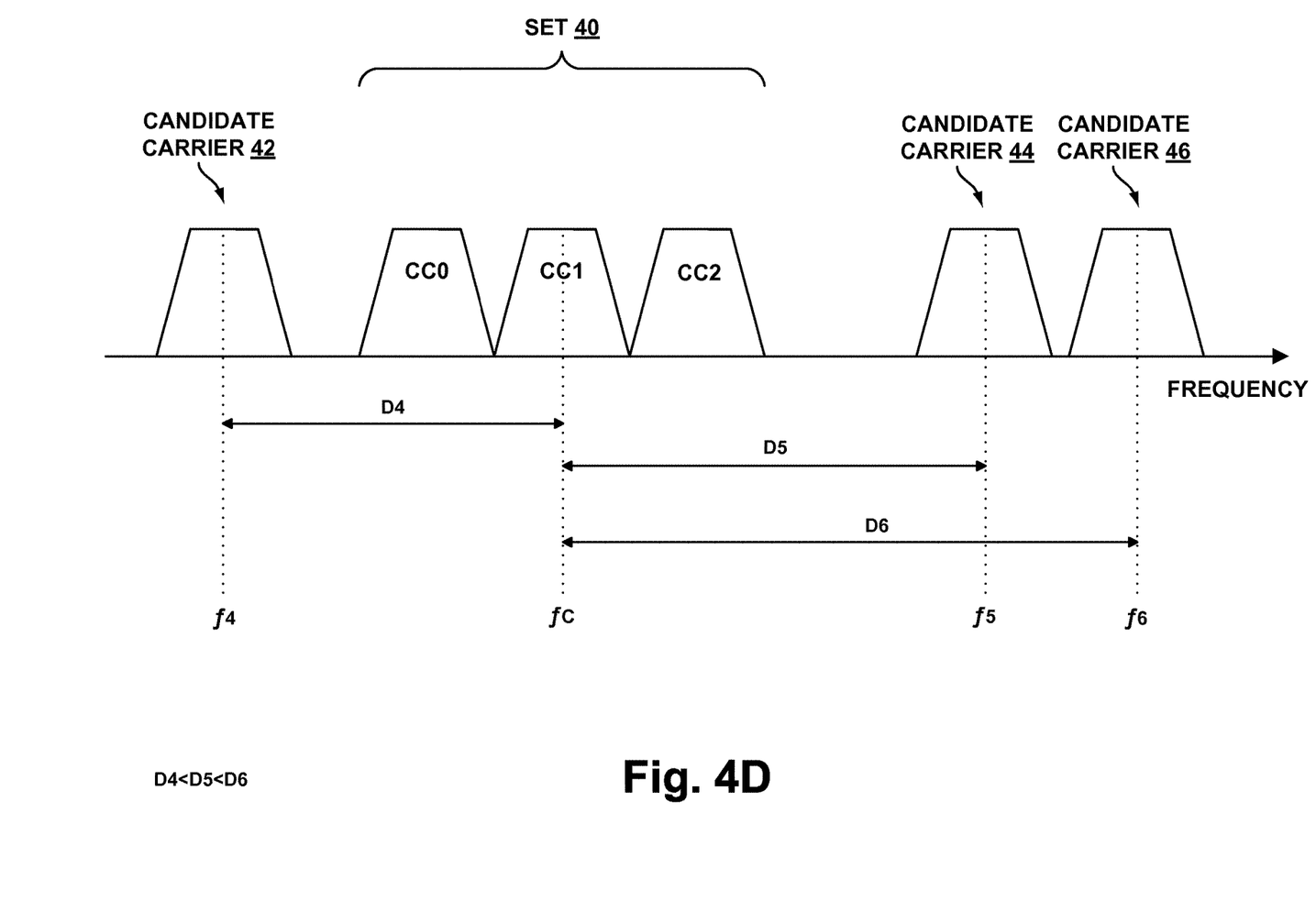

FIG. 4D next depicts another example comparison of determined proximities for the purpose of determining a most proximate carrier. As shown here, the set 40 has a corresponding center frequency $f_C$, candidate carrier 42 has a corresponding center frequency $f_4$, candidate carrier 44 has a corresponding center frequency $f_5$, and candidate carrier 46 has a corresponding center frequency $f_6$. In this arrangement, the system may determine the absolute difference corresponding to each candidate carrier. As shown, the absolute difference between the center frequency $f_C$ of the set 40 and the center frequency $f_4$ of candidate carrier 42 is D4 (i.e., D4=$|f_C-f_4|$), the absolute difference between the center frequency $f_C$ of the set 40 and the center frequency $f_5$ of candidate carrier 44 is D5 (i.e., D5=$|f_C-f_5|$), and the absolute difference between the center frequency $f_C$ of the set 40 and the center frequency $f_6$ of candidate carrier 46 is D6 (i.e., D6=$|f_C-f_6|$). The system may then determine the smallest absolute difference from among D4, D5, and D6. As illustrated, D4 is the smallest absolute difference from among D4, D5, and D6. As such, the system may determine that candidate carrier 42 is the most proximate carrier from the set including candidate carriers 42-46 and may select candidate carrier 42 as the at least one other carrier on which the wireless communication system should serve the UE 14. Other examples may also be possible.

In addition to the above proximity considerations, the system may also select the at least one other carrier based on considerations of load on the candidate carriers 42-46 and/or on carriers of the base set of one or more carrier (e.g., set 40). In one case, the system may select the at least one other carrier to add based on the at least one other carrier having a load that is below a threshold load (e.g., considering load in the manner discussed above). The threshold load may be predefined or the system may define the threshold load based on capacity demand of the UE 14, among other possibilities. Note that the system may alternatively select the at least one other carrier to add based on the at least one other carrier having available capacity that is above a threshold available capacity, among other possible threshold considerations.

In an example implementation, the system may determine the most proximate carrier, from the set of candidate carriers, and then determine whether this most proximate carrier has a load that is below the threshold load. If the system determines that the most proximate carrier has a load that is below the threshold load, the system may select this most proximate carrier as the at least one other carrier on which the system should serve the UE 14. Whereas, if the system determines that the most proximate carrier has a load that is above the threshold load, the system may determine the next most proximate carrier and then determine whether the next most proximate has a load that is below the threshold load. The system may continue the determinations in this manner until the system determines that a candidate carrier has a load that is below the threshold load. Other example implementations may also be possible.

In another case, the wireless communication system can determine capacity demand of the served UE 14. The wireless communication system can also determine available capacity of a potential modified set that would include (i) the base set of one or more carriers on which the UE 14 is being served and (ii) the most proximate carrier. Subsequently, the wireless communication system may determine whether the available capacity of the potential modified set would meet (or exceed) the capacity demand of the served UE 14.

If the wireless communication system determines that the available capacity of the potential modified set would meet (or exceed) the capacity demand of the served UE 14, the system may use the most proximate carrier as the at least one other carrier on which the wireless communication system should serve the UE 14. Whereas, if the wireless communication system determines that the available capacity of the potential modified set would not meet (or would not exceed) the capacity demand of the served UE 14, the system may determine the next most proximate carrier and then determine available capacity of a different potential modified set that would include (i) the base set of one or more carriers on which the UE 14 is being served and (ii) the next most proximate carrier. The system may then determine whether available capacity of the different potential modified set would meet (or exceed) the capacity demand of the UE 14. The system may continue the determinations in this manner until the system determines that some potential modified set has available capacity that exceeds capacity demand of the UE 14. Other cases and other examples of load considerations may also be possible.

In a further aspect, the system may use the load considerations discussed above for determination of the set of candidate carriers from which the system selects the at least one other carrier. As an example, the set of candidate carriers may only include carriers having loads that exceed a threshold load. In this manner, prior to selection of the at least one other carrier, the system may essentially filter out any candidate carriers that do not meet the load considerations and establish a set of candidate carrier from which the system can select the at least one other carrier based on considerations of proximity as discussed above, among others. In yet a further aspect, the system could determine two or more candidate carriers that are equally proximate to the set 40. In this scenario, the system may select the candidate carrier, from among the equally proximate carriers, that meets the load considerations discussed above. For instance, the system may select the candidate carrier that has a load that is below the threshold load.

Further, if multiple candidate carriers, from among the equally proximate carriers, meet the load considerations discussed above, the system may arbitrarily select the candidate carrier to add or may carry out other considerations. If no candidate carriers, from among the equally proximate carriers, meet the load considerations, the system may arbitrarily select the candidate carrier to add or may carry out other considerations. Such other considerations may involve selection of the candidate carrier, from among the equally proximate carriers, having the lowest load and/or selection of the candidate carrier having the highest respective channel quality. Other example considerations may also be possible.

Figure 4E:
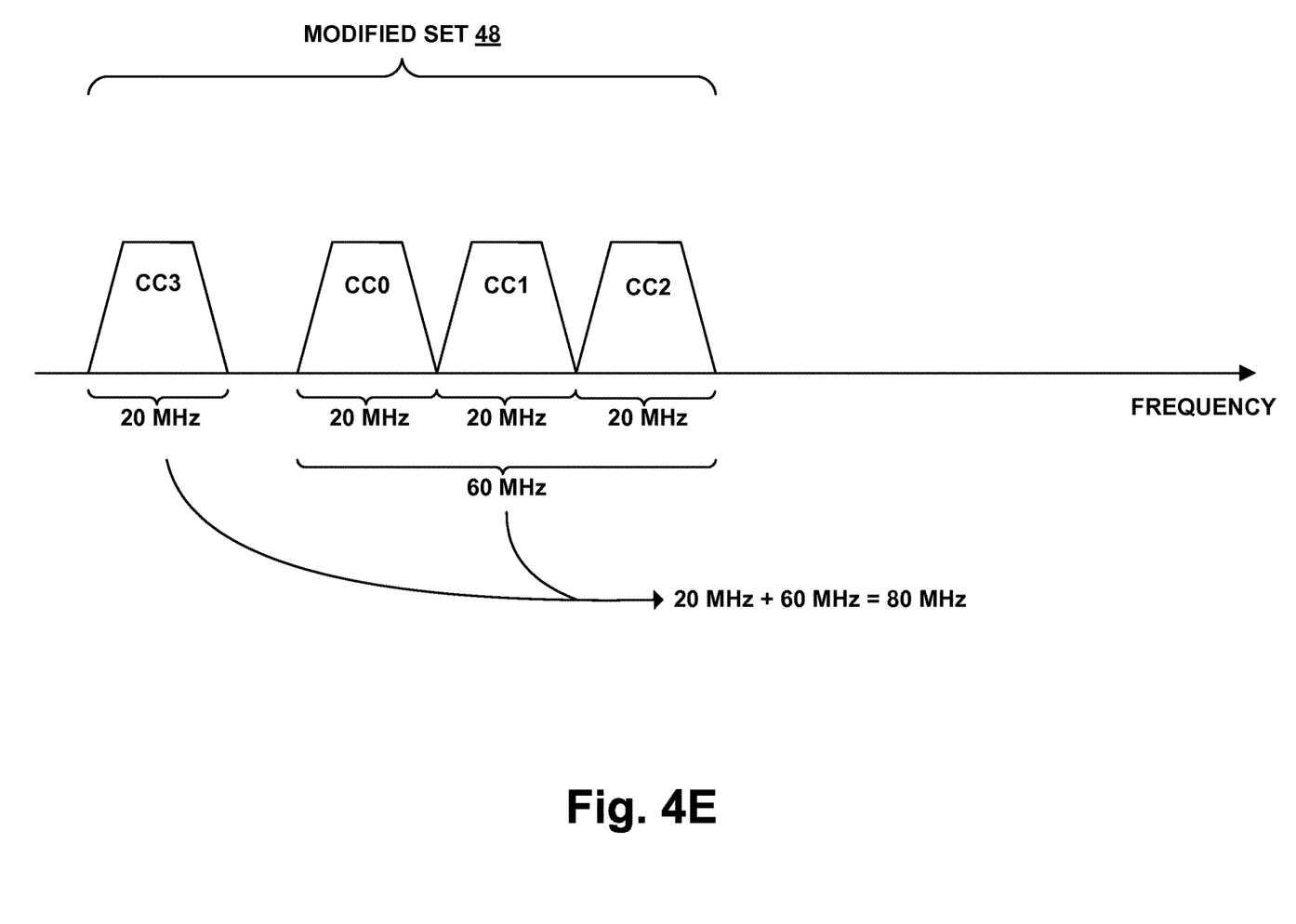

As noted above, method 300 involves, based on the selecting, the wireless communication system adding the selected at least one other carrier to the set of one or more carriers to establish a modified set of carriers. Once the system selects at least one other carrier to add, the system may establish a modified set that includes the selected carrier as well as the carriers of the base set on which the UE 14 is already being served. Moreover, the system may define the selected carrier as a secondary carrier in the modified set. For instance, FIG. 4E depicts an example modified set 48 of carriers that includes primary component carrier CC0 and three secondary component carriers CC1, CC2, and CC3. To achieve this arrangement, the system selected candidate carrier 42 and defined candidate carrier 42 as a secondary carrier CC3 that is now part of the modified set 48 of carriers. As shown, the component carriers CC0, CC1, and CC2 are contiguous with each other while component carrier CC3 is non-contiguous with component carriers CC0, CC1, and CC2. Additionally, each component carrier in the modified set 48 spans a bandwidth of 20 MHz, thereby amounting to an increase in the total aggregated bandwidth from 60 MHz in set 40 to 80 MHz in modified set 48.

As noted above, method 300 then involves causing the wireless communication system to serve the UE on the modified set of carriers. If the base set includes a single base carrier, the base station may add a carrier onto the base set and then serve the UE with carrier aggregation using a modified set of carriers that includes the base carrier and the added carrier. Moreover, the base station may designate the base carrier as a primary carrier and the added carrier as a secondary carrier (or vice versa). In contrast, if the base station is already serving the UE with carrier aggregation on a base set of multiple carriers, an added carrier may define an additional secondary carrier on which the base station could serve the UE. In this case, addition of a carrier results in a modified set of carriers that includes the multiple carriers of the base set as well as the added secondary carrier. After addition of the secondary carrier, the base station can then serve the UE with carrier aggregation on the modified set of carriers, such as by scheduling and transmitting bearer data to the UE concurrently on multiple carriers of the modified set.

In an example implementation, the eNodeB 12 can send an RRC connection reconfiguration message to the UE 14 in order to specify the modified set 48 of component carriers to be used to serve the UE 14 in a carrier aggregation arrangement. In particular, the RRC connection reconfiguration message may identify the UE 14 (e.g., using the GUTI) and direct the UE 14 to operate on multiple component carriers. Moreover, the RRC connection reconfiguration message may identify the particular component carriers of the modified set 48, such as by specifying the corresponding frequency ranges of the component carriers, and may designate one component carrier as a primary carrier and the remaining component carriers as secondary carriers. The eNodeB 12 may carry out this designation by assigning an ID number corresponding to each component carrier on which the UE 14 should be served such that the eNodeB 12 and/or the UE 14 can refer to specific component carriers, using the ID number, during transmissions. For instance, an ID number of 0 may designate the primary carrier CC0 while ID numbers ranging between 1 and 3 may respectively designate the secondary carriers CC1, CC2, and CC3. After receiving the RRC connection reconfiguration message, the UE 14 may then be set to monitor transmissions on the modified set 48 of component carriers.

Exemplary embodiments have been described above. Those skilled in the art will understand, however, that changes and modifications may be made to these embodiments without departing from the true scope and spirit of the invention.

We claim:

1. A method operable in a wireless communication system including a base station that radiates to provide wireless coverage in which to serve user equipment devices (UEs), wherein the base station is configured to provide service within a frequency spectrum that includes a plurality of carriers, each carrier defining a respective range of frequency within the frequency spectrum, the method comprising:

serving a UE, by the wireless communication system, on a set of one or more carriers from the plurality of carriers;

while serving the UE on the set of one or more carriers, determining that the wireless communication system should serve the UE on at least one other carrier in addition to serving the UE on the set of one or more carriers;

selecting the at least one other carrier, from a set of candidate carriers, based at least in part on the at least one other carrier being closest, of the set of candidate carriers, in the frequency spectrum to the set of one or more carriers;

based on the selecting, adding the selected at least one other carrier to the set of one or more carriers to establish a modified set of carriers; and causing the wireless communication system to serve the UE on the modified set of carriers.

2. The method of claim 1, wherein the set of one or more carriers comprises carriers that are contiguous with each other.

3. The method of claim 2, wherein the at least one other carrier is non-contiguous with the set of one or more carriers.

4. The method of claim 1, wherein the selecting is additionally based at least in part on the at least one other carrier having a load that is below a threshold load.

5. The method of claim 1, further comprising determining capacity demand of the served UE, wherein determining that the wireless communication system should serve the UE on at least one other carrier in addition to serving the UE on the set of one or more carriers is based at least in part on the determined capacity demand exceeding available capacity of the set of one or more carriers.

6. The method of claim 1, further comprising determining capacity demand of the served UE, wherein the selecting comprises selecting the at least one other carrier such that available capacity of the modified set meets the determined capacity demand.

7. The method of claim 1, wherein the at least one other carrier being closest in the frequency spectrum to the set of one or more carriers is based on proximity of (i) at least one frequency of the set of one or more carriers to (ii) at least one frequency of the at least one other carrier.

8. The method of claim 7, wherein selecting the at least one other carrier based at least in part on the at least one other carrier being closest in the frequency spectrum to the set of one or more carriers comprises:

determining proximity of each carrier, of the set of candidate carriers, to the set of one or more carriers;

comparing the determined proximities to determine at least one most proximate carrier from the set of candidate carriers; and selecting the determined at least one most proximate carrier as the at least one other carrier on which the wireless communication system should serve the UE.

9. The method of claim 8, wherein the wireless communication system comprises data storage that contains information related to proximity of carriers, and wherein determining proximity of each carrier to the set of one or more carriers comprises obtaining at least some of the information from data storage and using the obtained information to define the proximity of each carrier to the set of one or more carriers.

10. A non-transitory computer readable medium having stored thereon instructions executable by a processor to cause a wireless communication system to perform operations, the wireless communication system including a base station that radiates to provide wireless coverage in which to serve user equipment devices (UEs), wherein the base station is configured to provide service within a frequency spectrum that includes a plurality of carriers, each carrier defining a respective range of frequency within the frequency spectrum, the operations comprising:
  serving a UE on a set of one or more carriers from the plurality of carriers;
  while serving the UE on the set of one or more carriers, determining that the wireless communication system should serve the UE on at least one other carrier in addition to serving the UE on the set of one or more carriers;
  selecting the at least one other carrier, from a set of candidate carriers, based at least in part on the at least one other carrier being closest, of the set of candidate carriers, in the frequency spectrum to the set of one or more carriers;
  based on the selecting, adding the selected at least one other carrier to the set of one or more carriers to establish a modified set of carriers; and
  causing the wireless communication system to serve the UE on the modified set of carriers.

11. The non-transitory computer readable medium of claim 10, wherein the set of one or more carriers comprises carriers that are contiguous with each other.

12. The non-transitory computer readable medium of claim 11, wherein the at least one other carrier is non-contiguous with the set of one or more carriers.

13. The non-transitory computer readable medium of claim 10, wherein the selecting is additionally based at least in part on the at least one other carrier having a load that is below a threshold load.

14. The non-transitory computer readable medium of claim 10, the operations further comprising:
  determining capacity demand of the served UE, wherein determining that the wireless communication system should serve the UE on at least one other carrier in addition to serving the UE on the set of one or more carriers is based at least in part on the determined capacity demand exceeding available capacity of the set of one or more carriers.

15. The non-transitory computer readable medium of claim 10, the operations further comprising:
  determining capacity demand of the served UE, wherein the selecting comprises selecting the at least one other carrier such that available capacity of the modified set meets the determined capacity demand.

16. The non-transitory computer readable medium of claim 10, wherein the at least one other carrier being closest in the frequency spectrum to the set of one or more carriers is based on proximity of (i) at least one frequency of the set of one or more carriers to (ii) at least one frequency of the at least one other carrier.

17. The non-transitory computer readable medium of claim 16, wherein selecting the at least one other carrier based at least in part on the at least one other carrier being closest in the frequency spectrum to the set of one or more carriers comprises:
  determining proximity of each carrier, of the set of candidate carriers, to the set of one or more carriers;
  comparing the determined proximities to determine at least one most proximate carrier from the set of candidate carriers; and
  selecting the determined at least one most proximate carrier as the at least one other carrier on which the wireless communication system should serve the UE.

18. The non-transitory computer readable medium of claim 17, wherein the wireless communication system comprises data storage that contains information related to proximity of carriers, and wherein determining proximity of each carrier to the set of one or more carriers comprises obtaining at least some of the information from data storage and using the obtained information to define the proximity of each carrier to the set of one or more carriers.

19. A wireless communication system comprising:
  a base station that radiates to provide wireless coverage in which to serve user equipment devices (UEs), wherein the base station is configured to provide service within a frequency spectrum that includes a plurality of carriers, each carrier defining a respective range of frequency within the frequency spectrum; and
  a controller configured to cause the base station to perform operations comprising:
    serving a UE on a set of one or more carriers from the plurality of carriers;
    while serving the UE on the set of one or more carriers, determining that the wireless communication system should serve the UE on at least one other carrier in addition to serving the UE on the set of one or more carriers;
    selecting the at least one other carrier, from a set of candidate carriers, based at least in part on the at least one other carrier being closest, of the set of candidate carriers, in the frequency spectrum to the set of one or more carriers;
    based on the selecting, adding the selected at least one other carrier to the set of one or more carriers to establish a modified set of carriers; and
    causing the wireless communication system to serve the UE on the modified set of carriers.

20. The wireless communication system of claim 19, wherein the controller is part of the base station.

* * * * *